Patented May 7, 1946

2,399,948

UNITED STATES PATENT OFFICE 2,399,948

COMPOUNDING AND VULCANIZATION OF SYNTHETIC RUBBER

Albert A. Somerville, Carmel, N. Y., assignor to R. T. Vanderbilt Company, Inc., New York, N. Y., a corporation of New York No Drawing. Application February 17, 1944, Serial No. 522,789

2 Claims. (Cl. 260—79)

My invention relates to improvements in the compounding and vulcanization of synthetic rubbers produced by copolymerization of butadiene and styrene. Synthetic rubbers of this type are illustrated by the copolymer product currently designated GR-S rubber. In my application Serial No. 522,785, filed February 17, 1944, I have described my discovery that appropriate additions of copper, as such or as appropriate compounds, to compounds of this type of synthetic rubber affords important improvements with respect to rate of cure and variability, particularly in rate of cure, when these compounds are vulcanized with sulfur, as such, in amount exceeding that required to form cupric sulfide with the copper present. I have found that copper is with advantage added to compounds of such synthetic rubber, in applying my discovery, as a copper salt of mercaptobenzothiazole. The copper salt of mercaptobenzothiazole may be typified as follows:

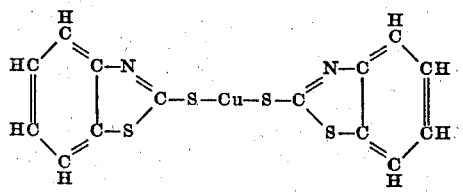

Dispersion of the copper in the compound is thus promoted and particles of metallic copper are eliminated as a constituent of the compound.

The following examples will illustrate the practice of my invention and include comparisons indicating some of its advantages. In the tabulations of these compounds, cures and physical properties, the compound of each example was made up of the number of parts by weight indicated opposite each designated component, the cures were in a platen press for the periods indicated in minutes at the left under the curing temperature, all of the cures in the group being effected at the same temperature, and, for each period of cure, the values for stress at 300% elongation in pounds per square inch appear under "S," for tensile strength in pounds per square inch under "T," for percentage elongation at break under "E," and for Shore hardness under "H."

|  | Example I | Example II |
|---|---|---|
| GR-S rubber | 100 | 100 |
| Plasticizer | 5 | 5 |
| Zinc oxide | 5 | 5 |
| Channel carbon black | 50 | 50 |
| Sulfur | 2 | 2 |
| Zinc diethyldithiocarbamate | 0.15 | 0.15 |
| Mercaptobenzothiazole | 1.5 | ---- |
| Copper salt of mercaptobenzothiazole | ---- | 1.5 |

BEFORE AGEING

| 307° F. | S | T | E | H | S | T | E | H |
|---|---|---|---|---|---|---|---|---|
| 5 minutes | Uncured | | | | 220 | 630 | 730 | 48 |
| 10 minutes | 360 | 1320 | 700 | 53 | 1140 | 2680 | 525 | 61 |
| 15 minutes | 610 | 2350 | 685 | 56 | 1700 | 2460 | 390 | 64 |
| 20 minutes | 1020 | 2650 | 535 | 59 | 1815 | 2140 | 340 | 65 |

AFTER 24 HOURS IN HOT AIR OVEN AT 250° F.

| | S | T | E | H | S | T | E | H |
|---|---|---|---|---|---|---|---|---|
| 5 minutes | | | | | | 900 | 85 | 77 |
| 10 minutes | | 1510 | 130 | 78 | | 1450 | 120 | 80 |
| 15 minutes | | 1400 | 120 | 80 | | 1325 | 115 | 80 |
| 20 minutes | | 1275 | 110 | 80 | | 1240 | 110 | 80 |

The acceleration in rate of cure will be apparent from a comparison of the values for stress at 300% elongation and for tensile strength and the percentage elongation at break particularly for the 5, 10 and 15 minute cures. The comparison of these values for the two examples illustrates the improvement to be secured as described in my concurrently filed application above identified. The relative values for stress at 300% elongation, tensile strength and elongation at break attained in 10 minutes in Example II were attained in about 20 minutes in Example I.

The proportion of sulfur used is not critical and may follow conventional practices providing it is added to the compound subjected to vulcanization in amount exceeding that required to combine with the added copper to form cupric sulfide as described in my concurrently filed application previously identified.

The plasticizer used in the foregoing examples was a mixture of 15 parts by weight of a petroleum sulfonate, 5 parts of normal butyl alcohol and 80 parts of a viscous petroleum oil (currently sold under the trade-name "Reogen").

My invention includes the vulcanizable but unvulcanized copolymer of butadiene and styrene containing sulfur and a copper salt of mercaptobenzothiazole and the product of vulcanization of such copolymer compounds containing a copper salt of mercaptobenzothiazole.

I claim:

1. A vulcanizable compound comprising a rubber-like copolymer of butadiene and styrene, a copper salt of mercaptobenzothiazole in a quantity sufficient to accelerate the rate of cure upon vulcanization of the compound, and an amount of sulfur exceeding the amount required to convert all of the copper in the copper salt to cupric sulfide.

2. The product of the vulcanization of the compound of claim 1.

ALBERT A. SOMERVILLE.